(12) United States Patent
Pilnik et al.

(10) Patent No.: US 11,909,848 B2
(45) Date of Patent: Feb. 20, 2024

(54) MULTI-FLOW COMPRESSION

(71) Applicant: MELLANOX TECHNOLOGIES TLV LTD., Raanana (IL)

(72) Inventors: David Pilnik, Rishon Lezion (IL); Yair Chasdai, Tel Aviv (IL); Liran Daniel, Holon (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 251 days.

(21) Appl. No.: 16/924,221

(22) Filed: Jul. 9, 2020

(65) Prior Publication Data

US 2022/0014607 A1 Jan. 13, 2022

(51) Int. Cl.
*H04L 69/04* (2022.01)
*H04L 49/00* (2022.01)

(52) U.S. Cl.
CPC .......... *H04L 69/04* (2013.01); *H04L 49/3063* (2013.01); *H04L 2212/00* (2013.01)

(58) Field of Classification Search
CPC .. H04L 69/04; H04L 49/3063; H04L 2212/00
See application file for complete search history.

(56) References Cited

U.S. PATENT DOCUMENTS

| | | | | |
|---|---|---|---|---|
| 7,154,416 B1* | 12/2006 | Savage | ............... | H03M 7/30 341/51 |
| 7,420,992 B1* | 9/2008 | Fang | ............... | H04L 12/4633 370/477 |
| 7,573,827 B2 | 8/2009 | Santos et al. | | |
| 7,839,779 B2 | 11/2010 | Singla et al. | | |
| 8,391,144 B1 | 3/2013 | Pannell et al. | | |
| 8,514,855 B1* | 8/2013 | Robertson | ........... | H04L 49/3063 370/389 |
| 2004/0170381 A1* | 9/2004 | Srinivasan | .......... | G10L 19/0212 386/338 |
| 2006/0029060 A1* | 2/2006 | Pister | ................... | H04W 40/00 370/389 |
| 2006/0088036 A1 | 4/2006 | De Prezzo | | |
| 2008/0069350 A1* | 3/2008 | Reinoso | ............... | H04N 7/1675 380/200 |
| 2011/0075049 A1* | 3/2011 | Ahluwalia | .......... | H04B 1/0007 348/731 |
| 2014/0122562 A1* | 5/2014 | Turner | .................. | G06F 16/951 709/203 |
| 2017/0195393 A1* | 7/2017 | Su | ......................... | H04L 65/601 |
| 2021/0263744 A1* | 8/2021 | Crupnicoff | .......... | G06F 9/30036 |

* cited by examiner

*Primary Examiner* — Samina F Choudhry

(74) *Attorney, Agent, or Firm* — Kligler & Associates Patent Attorneys Ltd.

(57) ABSTRACT

In one embodiment, a device includes a data compression engine configured to process data packets of multiple network flows received from a network, and compress respective groups of the received data packets into respective compressed packets for sending over the network, each respective compressed packet including respective ones of the received data packets from different ones of the network flows, wherein the network interface is configured to send the compressed packets over the network.

6 Claims, 12 Drawing Sheets

MULTI-FLOW COMPRESSION

FIELD OF THE INVENTION

The present invention relates to computer networks, and in particular, but not exclusively to, compression in computer networks.

BACKGROUND

In data communication networks, network congestion may occur, for example, when a buffer, port or queue of a network switch is overloaded with traffic. Techniques that are designed to resolve congestion in data communication networks are referred to as congestion control techniques and may include designing better hardware blocks in order to decrease latency of traffic in order to optimize the network throughput.

Techniques to prevent and resolve spreading congestion are also known in the art. For example, U.S. Pat. No. 7,573,827 describes a method of detecting congestion in a communications network and a network switch. The method comprises identifying an output link of a network switch as a congested link on the basis of a packet in a queue of the network switch which is destined for the output link, where the output link has a predetermined state, and identifying a packet in a queue of the network switch as a packet generating congestion if the packet is destined for a congested link.

U.S. Pat. No. 8,391,144 describes a network switching device that comprises first and second ports. A queue communicates with the second port, stores frames for later output by the second port, and generates a congestion signal when filled above a threshold. A control module selectively sends an outgoing flow control message to the first port when the congestion signal is present, and selectively instructs the second port to assert flow control when a flow control message is received from the first port if the received flow control message designates the second port as a target.

U.S. Pat. No. 7,839,779 describes a network flow control system, which utilizes flow-aware pause frames that identify a specific virtual stream to pause. Special codes may be utilized to interrupt a frame being transmitted to insert a pause frame without waiting for frame boundaries.

US Patent Publication 2006/0088036 describes a method of traffic management in a communication network, such as a Metro Ethernet network, in which communication resources are shared among different virtual connections each carrying data flows relevant to one or more virtual networks and made up of data units comprising a tag with an identifier of the virtual network the flow refers to, and of a class of service allotted to the flow, and in which, in case of a congestion at a receiving node, a pause message is sent back to the transmitting node for temporary stopping transmission. For a selective stopping at the level of virtual connection and possibly of class of service, the virtual network identifier and possibly also the class-of-service identifier are introduced in the pause message.

SUMMARY

There is provided in accordance with an embodiment of the present disclosure, a device including a data compression engine configured to process data packets of multiple network flows received from a network, and compress respective groups of the received data packets into respective compressed packets for sending over the network, each respective compressed packet including respective ones of the received data packets from different ones of the network flows, wherein the network interface is configured to send the compressed packets over the network.

Further in accordance with an embodiment of the present disclosure, the device includes a network interface configured to receive the data packets of the multiple network flows from the network, and send the compressed packets over the network, and processing pipeline circuitry configured to process data of the received data packets in a pipeline.

Still further in accordance with an embodiment of the present disclosure the data compression engine is configured to select the respective groups of the received data packets for compression responsively to the received data packets of each of the respective groups having a respective similarity above a given threshold.

Additionally, in accordance with an embodiment of the present disclosure the data compression engine is configured to compare ones of the received data packets responsively to any one or more of the following a Hamming distance comparison, an edit distance, or a statistical distance.

Moreover in accordance with an embodiment of the present disclosure the data compression engine is configured to select the respective groups of the received data packets for compression responsively to the received data packets of each of the respective groups being consecutive in a pipeline in which the received data packets are being processed.

Further in accordance with an embodiment of the present disclosure at least some of the packets in one of the groups of the received data packets are non-consecutive in a pipeline in which the received data packets are being processed.

Still further in accordance with an embodiment of the present disclosure the data compression engine is configured to select the respective groups of the received data packets for compression responsively to a dynamically configurable maximum window size.

Additionally, in accordance with an embodiment of the present disclosure the data compression engine is configured to select the respective groups of the received data packets for compression responsively to a maximum length of a packet that can be transmitted.

Moreover, in accordance with an embodiment of the present disclosure the data compression engine is configured to select the respective groups of the received data packets for compression responsively to the received data packets of each of the respective groups having a respective common destination node.

Further in accordance with an embodiment of the present disclosure the data compression engine is configured to add a first one and a second one of the received data packets to one of the groups responsively to the first data packet and the second data packet having a first similarity result above a first given threshold, and add a third one of the received data packets to the one group responsively to the third data packet having a similarity to the first similarity result above a second given threshold.

Still further in accordance with an embodiment of the present disclosure the data compression engine is configured to add a first one and a second one of the received data packets to one of the groups responsively to the first data packet and the second data packet having a similarity result above a first given threshold, and add a third one of the received data packets to the one group responsively to the third data packet having a similarity to the second data packet above a second given threshold.

Additionally, in accordance with an embodiment of the present disclosure, the device includes an encapsulation engine configured to separately encapsulate respective ones of the compressed packets.

There is also provided in accordance with another embodiment of the present disclosure, a device including a data decompression engine configured to process previously compressed packets compressing data packets of multiple network flows received from a network in a compressed state, and decompress respective ones of the compressed packets into respective groups of the data packets for sending over the network to destination nodes responsively to header data of the data packets, each respective group including respective ones of the data packets from different ones of the network flows.

Moreover, in accordance with an embodiment of the present disclosure, the device includes a network interface configured to receive, from the network, the previously compressed packets.

Further in accordance with an embodiment of the present disclosure, the device includes a decapsulation engine configured to decapsulate the compressed packets prior to decompression of the compressed packets.

There is also provided in accordance with still another embodiment of the present disclosure a computer network system, including a first network device, including a first network interface configured to receive data packets of multiple network flows from a network, processing pipeline circuitry configured to process data of the received data packets in a pipeline, and a data compression engine configured to compress respective groups of the received data packets into respective compressed packets, each respective compressed packet including respective ones of the received data packets from different ones of the network flows, wherein the first network interface is configured to send the compressed packets over the network, and a second network device including a second network interface configured to receive respective ones of the compressed packets from a network, and a data decompression engine configured to decompress respective ones of the compressed packets into respective groups of the data packets, wherein the second network interface is configured to send ones of the data packets over the network to respective destination nodes responsively to header data of the data packets.

Still further in accordance with an embodiment of the present disclosure the data compression engine is configured to select the respective groups of the received data packets for compression responsively to the received data packets of each of the respective groups having a respective similarity above a given threshold.

Additionally, in accordance with an embodiment of the present disclosure the data compression engine is configured to compare ones of the received data packets responsively to any one or more of the following a Hamming distance comparison, an edit distance, or a statistical distance.

Moreover in accordance with an embodiment of the present disclosure the data compression engine is configured to select the respective groups of the received data packets for compression responsively to the received data packets of each of the respective groups being consecutive in the pipeline in which the received data packets are being processed.

Further in accordance with an embodiment of the present disclosure at least some of the packets in one of the groups of the received data packets are non-consecutive in a pipeline in which the received data packets are being processed.

Still further in accordance with an embodiment of the present disclosure the data compression engine is configured to select the respective groups of the received data packets for compression responsively to a dynamically configurable maximum window size.

Additionally, in accordance with an embodiment of the present disclosure the data compression engine is configured to select the respective groups of the received data packets for compression responsively to a maximum length of a packet that can be transmitted.

Moreover, in accordance with an embodiment of the present disclosure the data compression engine is configured to select the respective groups of the received data packets for compression responsively to the received data packets of each of the respective groups having a respective common destination node.

Further in accordance with an embodiment of the present disclosure the data compression engine is configured to add a first one and a second one of the received data packets to one of the groups responsively to the first data packet and the second data packet having a first similarity result above a first given threshold, and add a third one of the received data packets to the one group responsively to the third data packet having a similarity to the first similarity result above a second given threshold.

Still further in accordance with an embodiment of the present disclosure the data compression engine is configured to add a first one and a second one of the received data packets to one of the groups responsively to the first data packet and the second data packet having a similarity result above a first given threshold, and add a third one of the received data packets to the one group responsively to the third data packet having a similarity to the second data packet above a second given threshold.

Additionally, in accordance with an embodiment of the present disclosure, the system includes an encapsulation engine configured to separately encapsulate respective ones of the compressed packets.

Moreover, in accordance with an embodiment of the present disclosure, the system includes a decapsulation engine configured to decapsulate the compressed packets prior to decompression of the compressed packets.

There is also provided in accordance with still another embodiment of the present disclosure, a software product, including a non-transient computer-readable medium in which program instructions are stored, which instructions, when read by a processing unit, cause the processing unit to process data packets of multiple network flows received from a network, and compress respective groups of the received data packets into respective compressed packets for sending over the network, each respective compressed packet including respective ones of the received data packets from different ones of the network flows, wherein the network interface is configured to send the compressed packets over the network.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Figure 1:
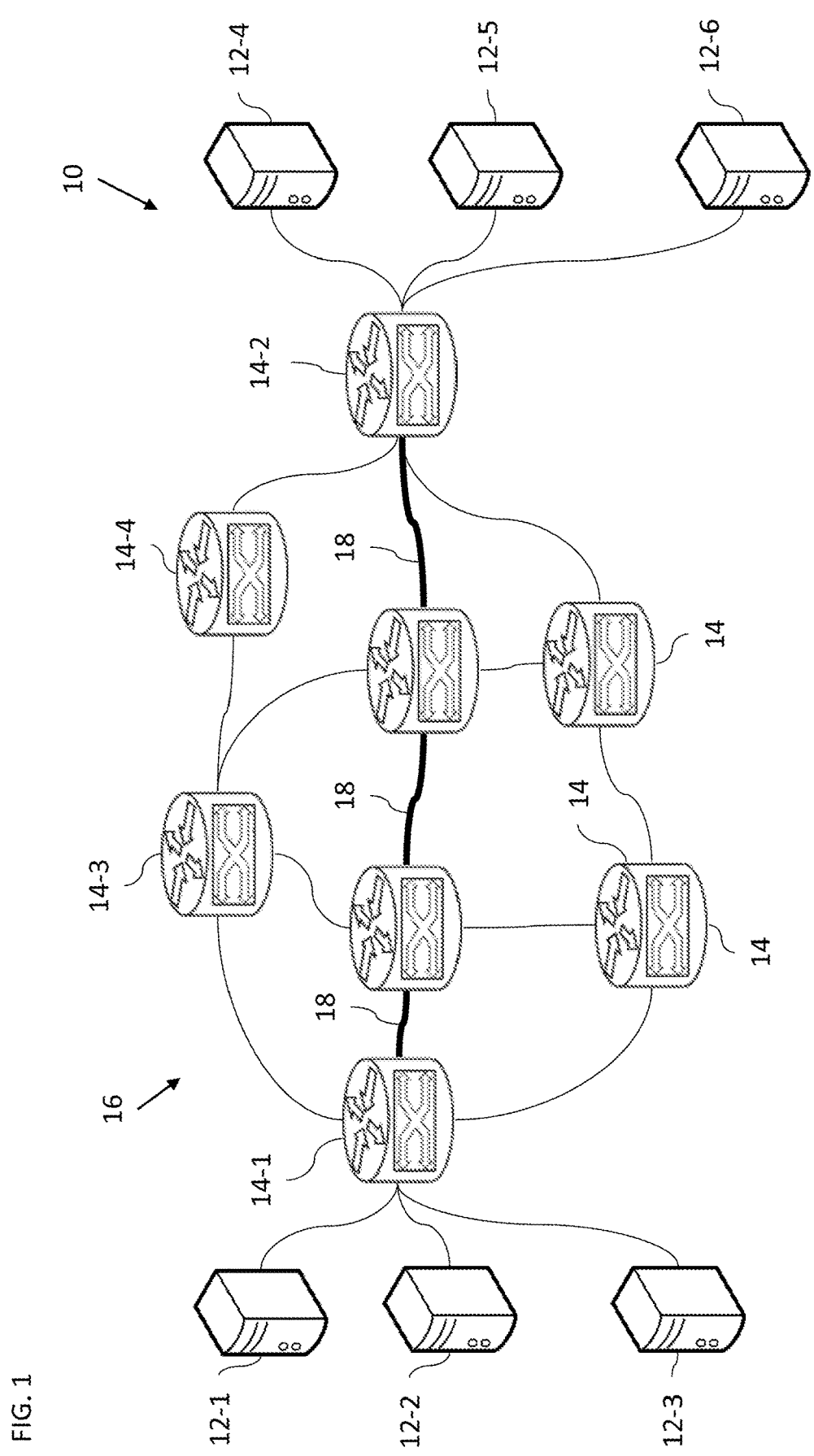
FIG. 1 is a block diagram view of a computer network system constructed and operative in accordance with an embodiment of the present invention.

As previously mentioned, in data communication networks, network congestion may occur. Network congestion may be reduced by reducing the network load, for example, by compressing data based on redundancy in the data. One method to compress data frames is based on the internal redundancy of each data frame. Compression based on internal redundancy provides a limited solution to network congestion.

Embodiments of the present invention reduce network congestion by performing data compression over packets of different network flows to increase network throughput, for example, in an end-to-end (E2E) network. By exploiting redundancy of data between multiple data flows, a compression algorithm may be applied on similar packets.

In disclosed embodiments, packets with a common destination hop and from different network flows are identified. The common destination hop may be a common final destination hop and or another common destination hop. For example, packets may be sent from two or more network hosts to one or more network hosts across an E2E network. In the E2E network, the packets arrive at network hop A for forwarding across the E2E network to network hop B (e.g., a final destination hop). The packets arriving at network hop A are therefore packets of different network flows with a common destination hop (e.g., network hop B). In the network hop A, packets of the different flows are compared for similarity and groups of similar packets are compressed into respective compressed packets for further transmission over the network by the network hop A. The packets are compared for similarity to determine if the cost of the compression (e.g., in terms of processing time and cost) provides a sufficient benefit in reducing network congestion. At the network hop B, the compressed packets are decompressed and forwarded to the packet destination(s) as indicated in the original (now decompressed) packets.

In some embodiments, adjacent packets (e.g., back-to-back packets) in a processing pipeline are compared for similarity. If two packets are sufficiently similar, they are added to a group for future compression. At least one of the two packets or a comparison result of the two packets, is then compared to the next adjacent packet in the pipeline for similarity. If the comparison process indicates that the packets are sufficiently similar, the third packet is added to the group for future compression. The process is repeated with subsequent adjacent packets until comparison does not result in sufficient similarity or until a group size limit is reached. All the packets in the group are compressed yielding a compressed packet. The compressed packet may be encapsulated with a descriptive header with relevant information prior to sending over the network. The above is repeated for other groups of packets yielding respective encapsulated compressed packets for sending over the network. Some of the packets may not be similar enough to other packets and are therefore sent to their destinations without being compressed.

The compressed encapsulated packets traverse the network as a part of a new protocol. At the common destination hop, the packets are decapsulated and decompressed yielding the original packets that are forwarded to their host(s).

In some embodiments, non-consecutive packets may also be compared for similarity. Disclosed embodiments described the comparison process for non-consecutive packets and how packet order is maintained.

The term "compressed" is used throughout the present specification and claims, in all of its grammatical forms, to refer to any type of non-lossy data compression. Typically, compression of data reduces the number of bits comprising the data in a non-lossy way so that the data may be decompressed to yield the original data.

System Description

Reference is now made to FIG. 1, which is a block diagram view of a computer network system 10 constructed and operative in accordance with an embodiment of the present invention. The computer network system 10 includes host devices 12 and network devices 14. The host devices 12, labeled 12-1 to 12-6, are transferring packets to each other across an end-to-end network 16 via some of the network devices 14 using multiple network flows. The network devices 14 represent network hops in the end-to-end network 16. For example, host device 12-1 is transferring packets to host device 12-4 thereby providing a first network flow, host device 12-2 is transferring packets to host device 12-5 thereby providing a second network flow, and host device 12-3 is transferring packets to host device 12-6 thereby providing a third network flow. The packets of all three network flows are received by the network device 14-1, which represents a first network hop for all three network flows. If the packets are not compressed, the packets would traverse the end-to-end network 16 individually, eventually arriving at the network device 14-2, which is a final network hop for all three network flows. Three host devices 12 sending packets to three host devices 12 are described by way of example only. Any suitable number of host devices 12 sending packets in two or more flows to one or more host devices 12 may be compressed according embodiments of the present invention.

Groups of the packets from the different network flows, with a common destination network hop are compressed by the network device 14-1 yielding compressed packets. The common destination hop may be a final common destination network hop or a non-final destination network hop. The common destination hop may be determined from a knowledge of the topology of the end-to-end network 16 or based on the packet header data and/or routing table data.

The compressed packets are generally encapsulated. The compressed packets are then forwarded over the end-to-end network 16 to the network device 14-2 via a suitable route 18. The network device 14-2 decapsulates and decompresses the received compressed packets yielding the original packets in uncompressed form. The network device 14-2 then forwards the decompressed packets to their final destination host devices 12.

In some embodiments, the compressing network device is not the initial network hop, but is another network hop (e.g., the network device 14-3) after the initial network hop in the end-to-end network 16. In some embodiments, the decompressing network device is not the final network hop, but is another network hop (e.g., the network device 14-4) before the final network hop in the network device.

The compressing network device 14 may be any suitable network device, for example, but not limited to, a switch or a multi-host network interface controller (NIC). Similarly, the decompressing network device 14 may be any suitable network device, for example, but not limited to, a switch or a multi-host network interface controller (NIC).

In some embodiments, the compression and/or decompression may be performed in one of the host devices 12, in a cable, or in a graphics processing unit (GPU), which may be configured to implement a graphics rendering pipeline to perform various operations related to generating pixel data based on graphics data supplied by a central processing unit (CPU). GPUs are employed to generate three-dimensional (3D) graphics objects and two-dimensional (2D) graphics objects for a variety of applications, including feature films, computer games, virtual reality (VR) and augmented reality (AR) experiences, mechanical design, and/or the like.

Figure 2:
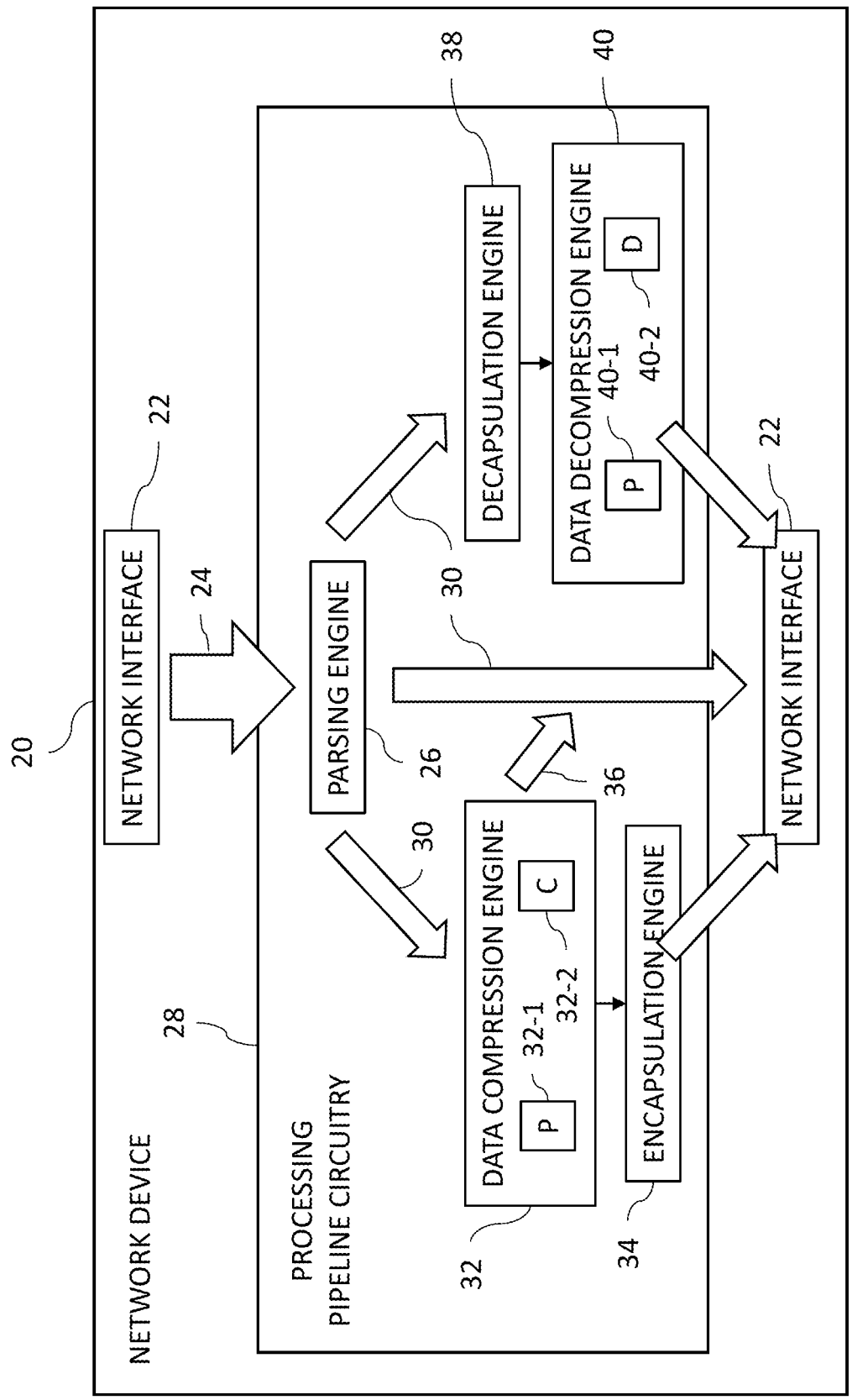
FIG. 2 is a block diagram view of a network device in the system of FIG. 1.

Reference is now made to FIG. 2, which is a block diagram view of a compressing/decompressing network device 20 in the system 10 of FIG. 1. The network device 20 described with reference to FIG. 2 includes both compression and decompression functionality. In some embodiments, the network device 20 may include compression or decompression functionality. The network device 20 may be used to perform the functionality of the network devices 14-1, 14-2, by way of example. The network device 14-1 may perform compression and/or decompression. Similarly, the network device 14-2 may perform compression and/or decompression.

The network device 20 includes a network interface 22. The network interface 22 has been shown as two separate interfaces for the sake of simplicity of illustration with the upper network interface 22 showing packets being received and the lower network interface 22 showing packets being transmitted. The network interface 22 may be configured as a single interface with one or more ports or as multiple interfaces, each with one or more ports. The network interface 22 is configured to receive data packets of multiple network flows from the network.

The network device 20 may include a parsing engine 26 to parse incoming packets (arrow 24), and classify the packets. The parsing engine 26 may be configured to identify packets for potential compression and compressed packets which require decompression.

In practice, some or all of the functions of the parsing engine 26 may be combined in a single physical component or, alternatively, implemented using multiple physical components. These physical components may comprise hard-wired or programmable devices, or a combination of the two. In some embodiments, at least some of the functions of the parsing engine 26 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The network device 20 includes processing pipeline circuitry 28 configured to process data of the received data packets in a pipeline 30.

The compression flow of the network device 20 is now described in overview.

The network device 20 includes a data compression engine 32. In some embodiments, the data compression engine 32 includes compression circuitry 32-2 and other processing circuitry 32-1. The processing circuitry 32-1 of the data compression engine 32 is configured to process data packets of multiple network flows received from the end-to-end network 16 (FIG. 1) including selecting packets, storing packets, and performing similarity checks as described in more detail with reference to FIG. 4 and the steps of FIGS. 8 and 10A except for the steps of blocks 92-96. The compression circuitry 32-2 of the data compression engine 32 is configured to compress respective groups of the received data packets into respective compressed packets for sending over the network as described in more detail with reference to FIG. 4 and the step of block 92 of FIGS. 8 and 10A. For example, a first compressed packet includes compressed data of a first group of the data packets, and a second compressed packet includes compressed data of a second group of the data packets. Each compressed packet includes respective received data packets from different network flows. For example, the first group of data packets in the first compressed packet includes packets of different network flows, and so on for other ones of the compressed packets. In some circumstances, it could occur that a compressed packet includes data packets from the same network flow.

The groups are selected based on a similarity of the packets in each group. An example process for determining similarity is described with reference to FIGS. 4, 8, and 10A-B.

A "network flow" is typically identified by the values of a specified set of header fields, such as the IP and TCP/UDP 5-tuple of source and destination addresses, source and destination ports, and protocol, or any suitable flow information such as layer 2, 3, 4 or tunnel data, which are consistent over all of the packets in the flow.

Packets which are not compressed are added back (arrow 36) to the regular packet processing. For example, if packets are not from multiple flows or the packets are not similar enough to neighboring packets (described in more detail with reference to FIG. 4), the packets may be added back to the regular packet processing.

In practice, some or all of the functions of the data compression engine 32 may be combined in a single physical component or, alternatively, implemented using multiple physical components. These physical components may comprise hard-wired or programmable devices, or a combination of the two. In some embodiments, at least some of the functions of the data compression engine 32 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The network device 20 may also include an encapsulation engine 34, which is configured to encapsulate each compressed packet. The encapsulation engine 34 is described in more detail with reference to FIG. 4.

The network interface 22 is configured to send the compressed packets (and other processed packets) over the end-to-end network 16.

The decompression flow of the network device 20 is now described in overview. The network interface 22 is configured to receive, from the end-to-end network 16, previously compressed packets (generally among other types of packets). The parsing engine 26 is configured to identify the compressed packets, for example, based on the encapsulation headers. The identified compressed packets are directed in the pipeline 30 for decapsulation and decompression.

The network device 20 includes a decapsulation engine 38 configured to decapsulate the compressed packets prior to decompression of the compressed packets. The network device 20 includes a data decompression engine 40. In some embodiments, the data decompression engine 40 includes decompression circuitry 40-2 and other processing circuitry 40-1. The processing circuitry 40-1 of the data decompression engine 40 is configured to process the previously compressed packets (which compress data packets of multiple network flows) received from the end-to-end network 16 in a compressed state including receiving compressed packets from the parsing engine 26 and forwarding decompressed packets to the pipeline 30 or the network interface 22. The decompression circuitry 40-2 of the data decompression engine 40 is configured to decompress respective ones of the compressed packets into respective groups of the (original now decompressed) data packets for sending by the network device 20 over the network 16 to destination nodes (e.g., host devices 12) responsively to header data of the data packets. For example, the original header data of the original data packets may be used to forward the data packets to their respective destination nodes.

In practice, some or all of the functions of the data decompression engine 40 may be combined in a single physical component or, alternatively, implemented using multiple physical components. These physical components may comprise hard-wired or programmable devices, or a combination of the two. In some embodiments, at least some of the functions of the data decompression engine 40 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 3:
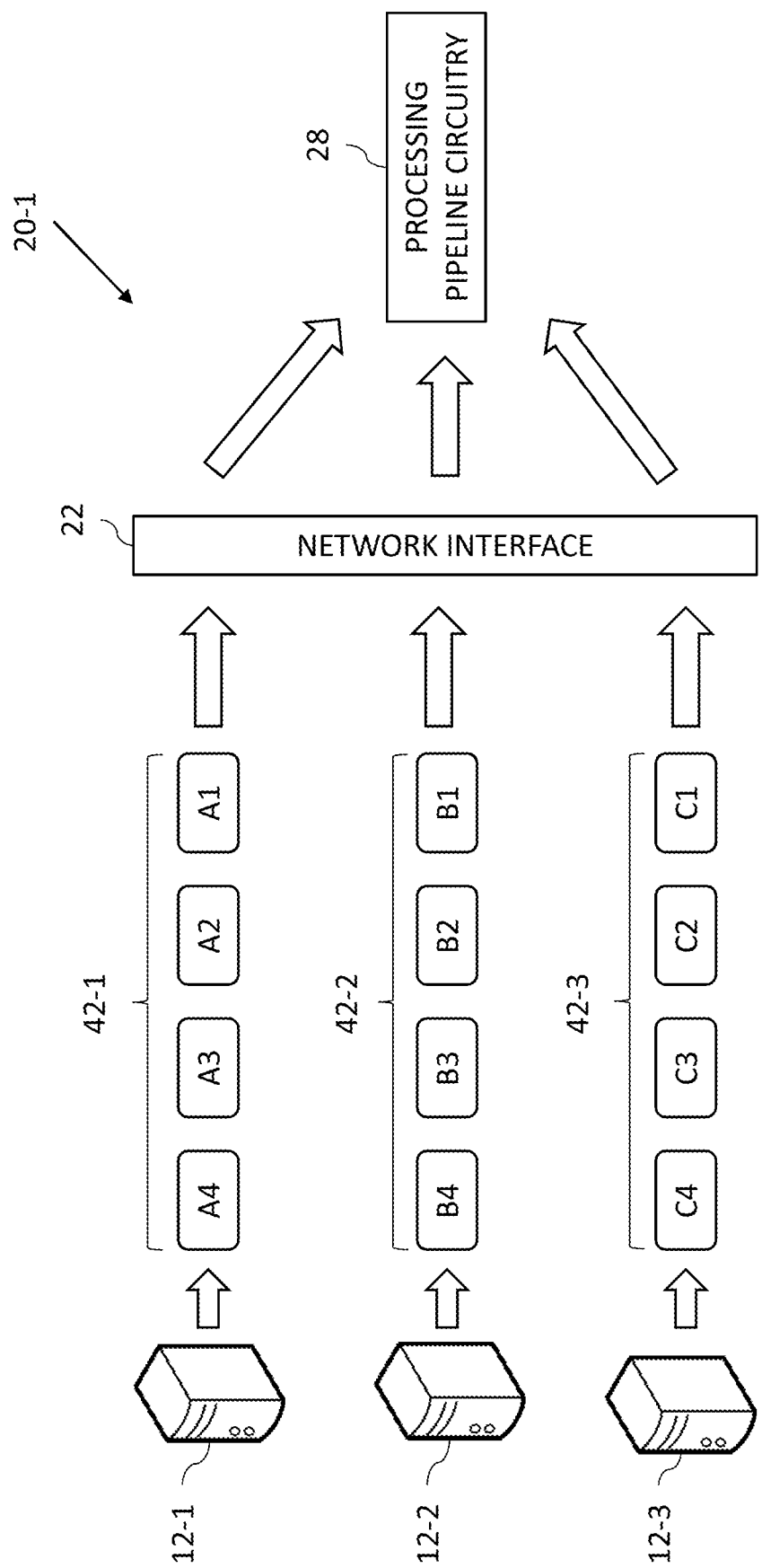
FIG. 3 is a schematic view of multiple flows being received by a network device in the system of FIG. 1.

Reference is now made to FIG. 3, which is a schematic view of multiple flows 42 being received by a network device 20-1 in the system 10 of FIG. 1. FIG. 3 shows the host devices 12-1, 12-2, 12-3 transmitting the network flows 42-1, 42-2, 42-3, respectively. For example, the network flow 42-1 is transmitted by the host device 12-1, the network flow 42-2 is transmitted by the host device 12-2, and so on. The packets of the different multiple flows 42 have be given different indexes in FIG. 3 to clearly distinguish between the packets of the different multiple flows 42 in this and subsequent figures. For example, the packets of the network flow 42-1 are labeled A1, A2 and so on. A1 being the first packet in that packet sequence. The packets of the network flow 42-2 are labeled B1, B2 and so on. B1 being the first packet in that packet sequence. The packets of the network flow 42-2 are labeled C1, C2 and so on. C1 being the first packet in that packet sequence. The multiple flows 42 are received by the network interface 22 of the network device 20-1 and forwarded to the processing pipeline circuitry 28 of the network device 20-1 for processing.

Figure 4:
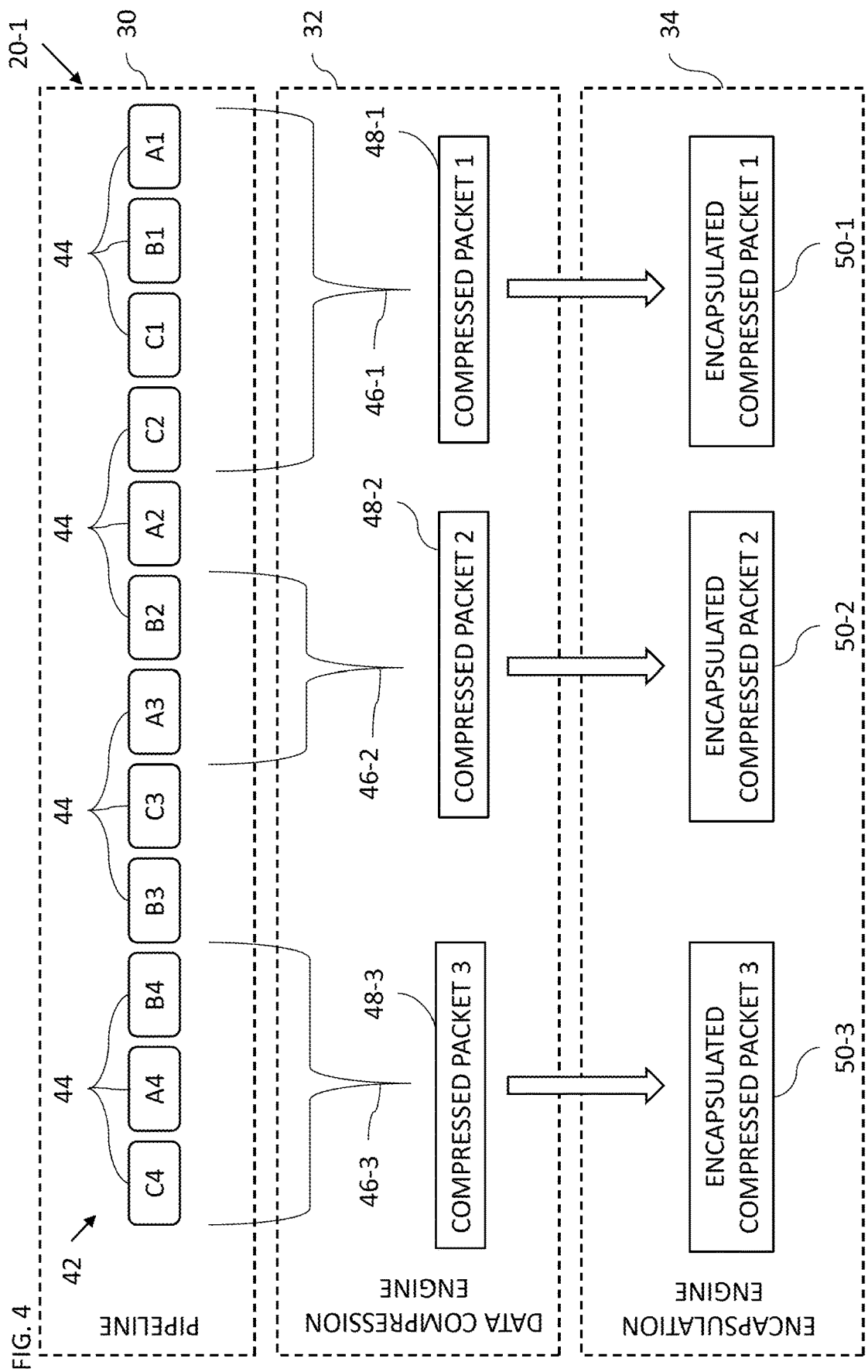
FIG. 4 is a schematic view of packets being compressed by a network device in the system of FIG. 1.

Reference is now made to FIG. 4, which is a schematic view of packets 44 being compressed by the network device 20-1 in the system 10 of FIG. 1.

The multiple flows 42 include packets 44 which are processed in the pipeline 30 of the processing pipeline circuitry 28 (FIG. 3). The packets 44 are generally processed in the pipeline 30 according to the order in which the packets 44 were received by the network device 20-1.

As previously mentioned, packets of different multiple flows that have a common destination network hop are potential candidates for compression. The data compression engine 32 is configured to select respective groups 46 of the received data packets 44 for compression responsively to the received data packets 44 of each of the respective groups 46 having a respective common destination node (e.g., the network devices 14-2 of FIG. 1). For the sake of simplicity, the packets 44 shown in the pipeline 30 of FIG. 4 all have a common destination network hop and are therefore potential candidates for compression.

The data compression engine 32 is configured to select the respective groups 46 of the received data packets 44 for compression responsively to the received data packets 44 of each of the respective groups 46 having a respective similarity above a given threshold.

For example, the first packet A1 is compared to packet B1 for similarity. In the example of FIG. 4, it was found that packet A1 is sufficiently similar to the packet B1. Therefore, both A1 and B1 are added to group 46-1, for example, in a staging area in a memory (not shown). Then, the existing group 46-1 is compared with the next packet C1 to determine if C1 is sufficiently similar to the packet(s) 44 of the group 46-1. The comparison may be made by comparing C1 to A1 and/or B1 or comparing C1 to a result which is representative of A1 and/or B1, for example, a result of the comparison of A1 with B1. In the example of FIG. 4, it was found that packet C1 is sufficiently similar to the packet(s) in the group 46-1. Therefore, packet C1 is added to group 46-1. Similar processing is performed for the next packet C2, which is also added to the group 46-1. Similar processing is performed for the next packet A2, which is found not to be sufficiently similar to the packet(s) of the group 46-1. The packet A2 is then compared to next the packet B2. However, packet A2 is not found to be sufficiently similar to the packet B2. Therefore, the packet A2 is not added to a group.

The above processing is repeated for subsequent packets, and packets B2 and A3 are added to a group 46-2, packets B3 and C3 are not added to any group, and the packets B4, A4, and C4 are added to a group 46-3.

The data compression engine 32 may be configured to perform the comparison between packets or between a packet and a comparison result using any suitable comparison method. In some embodiments, the data compression engine 32 is configured to compare received data packets responsively to any one or more of the following: a Hamming distance comparison; an edit distance; or a statistical distance. In a Hamming distance comparison, the Hamming distance between two packets is the number of positions at which the corresponding symbols are different. Edit Distance measures the minimum number of substitutions required to change one packet into the other. Statistical Distance measures a statistical trait of the packet data e.g., the amount of 1's and 0's in the packet data.

As previously mentioned, a packet may be compared for similarity with another packet or with another similarity result. Therefore, in some embodiments, the data compression engine 32 is configured to: add a first received data packet and a second received data packet to a group responsively to the first received data packet and the second received data packet having a similarity result above a given threshold; and add a third received data packet to that group responsively to the third received data packet having a similarity to the second received data packet (or the first received data packet) above a given threshold. In other embodiments, the data compression engine 32 is configured to add the third received data packet to that group responsively to the third received data packet having a similarity to the similarity result above a given threshold.

In some embodiments, in order to prevent problems associated with packet ordering, whereby packets are processed out of order, packets are selected from the pipeline 30 by the data compression engine 32 according to the order of the packets in the pipeline 30 and each group 46 only includes consecutive packets 44. The term "consecutive", as used in the specification and claims, is defined as back-to-back packets 44 in the pipeline 30 so that each group 46 only includes back-to-back packets from the pipeline 30 without any intervening packets being missing from that group 46. Therefore, the data compression engine 32 is configured to select the respective groups 46 of the received data packets 44 for compression responsively to the received data packets 44 of each respective group 46 being consecutive in the pipeline 30 in which the received data packets 44 are being processed.

In some embodiments, at least some of the packets in one or more of the groups of the received data packets 44 are non-consecutive in the pipeline 30 in which the received data packets 44 are being processed. For example, one group may include packets A1, B1, and C2 while C1 (an intervening packet) is not included in that group. In that example, C1 was not found to be sufficiently similar to A1 or B1. Then C2 was compared to A1 or B1 and was found to be sufficiently similar. The comparison process for non-consecutive packets 44 is described in more detail with reference to FIGS. 10A-B. As previously mentioned, packet ordering problems may occur when groups include non-consecutive packets 44. Therefore, in order to prevent the packet ordering problems, extra processing is provided as described in more detail with reference to FIGS. 10A-B, and 11.

In some embodiments, the number of packets 44 that may be included in a group 46 is limited due to one or more factors, including: a compressed packet having a maximum size based on a maximum transmission unit; and/or preventing too much latency in the end-to-end network 16. Therefore, in some embodiments, the data compression engine 32 is configured to select the respective groups 46 of the received data packets 44 for compression responsively to a dynamically configurable maximum window size. In some embodiments, the data compression engine 32 is configured to select the respective groups 46 of the received data packets 44 for compression responsively to a maximum length of a packet that can be transmitted over the end-to-end network 16.

The data compression engine 32 is configured to compress the respective packets 44 of the respective groups 46 into respective compressed packets 48. In the example of FIG. 4, the packets 44 in group 46-1 are compressed into compressed packet 48-1, the packets 44 in group 46-2 are compressed into compressed packet 48-2, and the packets 44 in group 46-3 are compressed into compressed packet 48-3.

The data compression engine 32 may compress the packets 44 of each group 46 using any suitable real-time lossless compression method, for example, using LZ77, LZW, LZ4, LZMA, or LZ78.

The encapsulation engine 34 is configured to separately encapsulate respective ones of the compressed packets 48 yielding respective encapsulated packets 50. In the example of FIG. 4, the compressed packet 48-1 is encapsulated yielding the encapsulated packet 50-1, the compressed packet 48-2 is encapsulated yielding the encapsulated packet 50-2, and the compressed packet 48-3 is encapsulated yielding the encapsulated packet 50-3. Each encapsulated packet 50 includes an encapsulation header, which may include any suitable information, for example, a destination address of the common hop to which the encapsulated packet 50 is to be forwarded, and optionally a list of packets compressed in that encapsulated packets 50 and optionally an indication that the packet payload of the compressed packet 48 is compressed.

Figure 5:
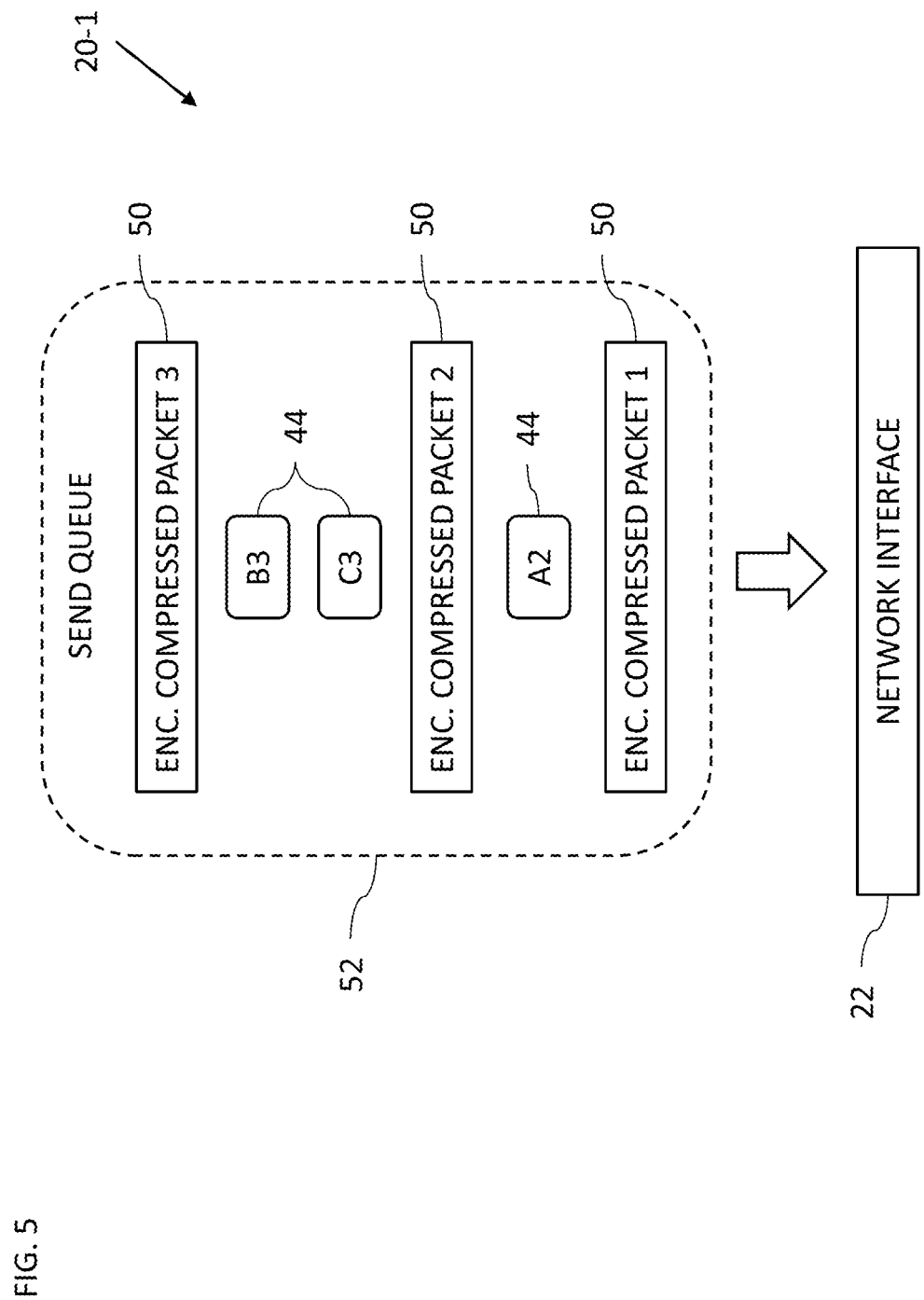
FIG. 5 is a schematic view of compressed and non-compressed packets being transmitted by a network device in the system of FIG. 1.

Reference is now made to FIG. 5, which is a schematic view of encapsulated packets 50 and non-compressed packets 44 being transmitted by the network device 20-1 in the system 10 of FIG. 1. FIG. 5 shows the encapsulated packets 50 and non-compressed packets 44 waiting in a send queue 52 for transmission over the network interface 22. The encapsulated packets 50 and non-compressed packets 44 are ordered in the send queue 52 according to the same order that the original packets in the encapsulated packets 50 and the non-compressed packets 44 were included in the pipeline 30 (FIG. 4). In some embodiments, the encapsulated packets 50 and the non-compressed packets 44 may be queued in more than one send queue.

Figure 6:
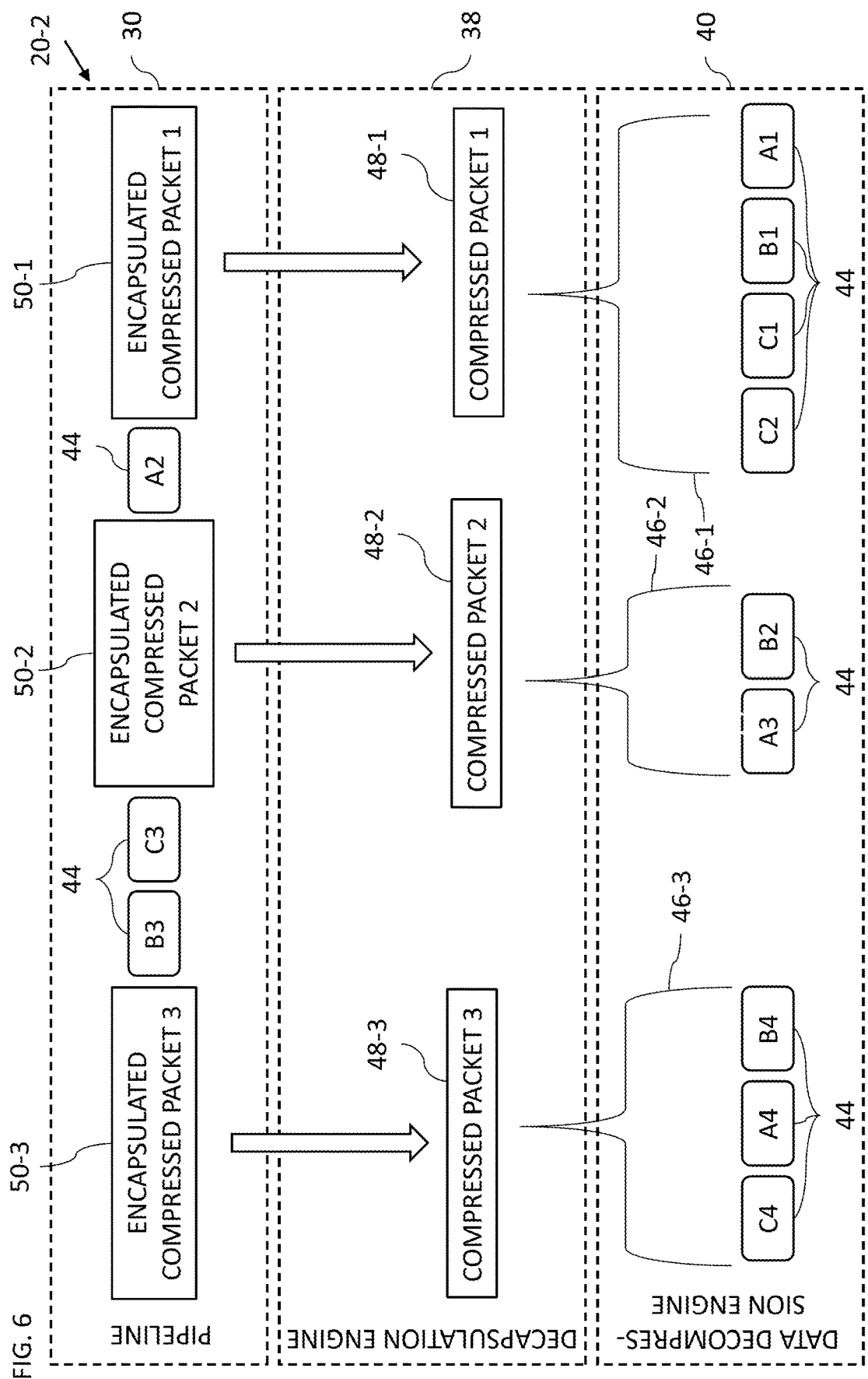
FIG. 6 is a schematic view of compressed packets being decompressed by a network device in the system of FIG. 1.

Reference is now made to FIG. 6, which is a schematic view of compressed packets 48 being decompressed by a network device 20-2 in the system 10 of FIG. 1.

The pipeline 30 receives the encapsulated packets 50 and the non-compressed packets 44. The decapsulation engine 38 is configured to decapsulate the encapsulated packets 50 yielding respective decapsulated compressed packets 48. For example, the encapsulated packet 50-1 is decapsulated yielding the compressed packet 48-1, and so on.

The data decompression engine 40 is configured to decompress the compressed packets 48 yielding the original (now decompressed) packets 44 of the respective groups 46. For example, the compressed packet 48-1 is decompressed yielding the original packets 44 (e.g., packet A1, B1, C1, C2) of group 46-1.

The uncompressed packets 44 (e.g., packets A2, B3, C3) are processed in the pipeline 30 without decapsulation or decompression.

Figure 7:
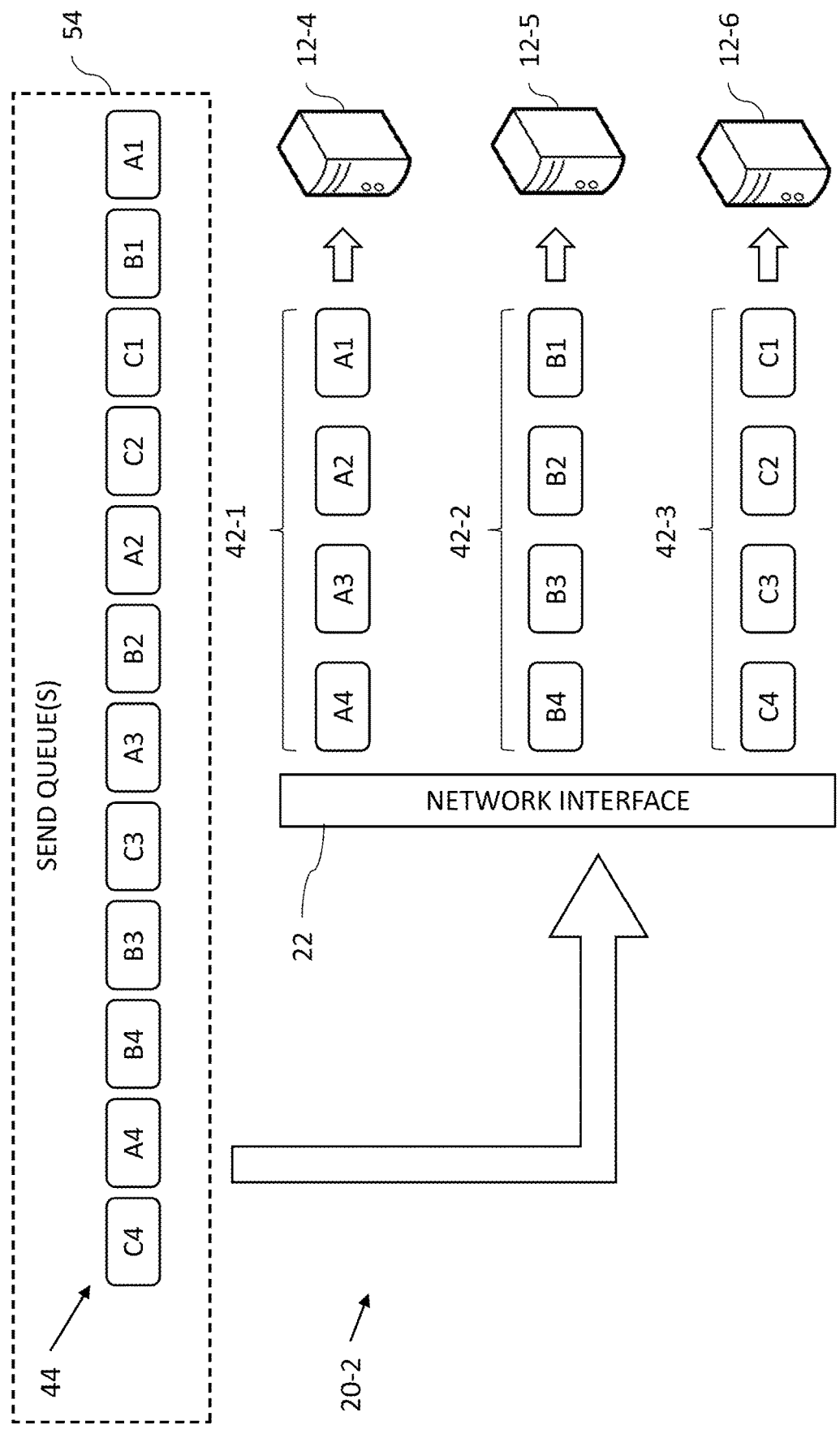
FIG. 7 is a schematic view of decompressed packets being transmitted by a network device in the system of FIG. 1.

Reference is now made to FIG. 7, which is a schematic view of decompressed packets 44 being transmitted by the network device 20-2 in the system 10 of FIG. 1. The packets 44 are included in a send queue 54 according to the original order of the packets 44 in the pipeline 30 of the network device 20-1 of FIG. 4. In some embodiments, the packets 44 may be queued in multiple queues according to the final destination host 12 of the packets 44. The order of the packets in the individual queues is still maintained according to the original order of the packets 44 in the pipeline 30 of the network device 20-1 of FIG. 4. The multiple flows 42 are transmitted to the respective host devices 12 via the network interface 22 according to the header information of each of the packets 44. For example, the packets 44 in network flow 42-1 are transmitted to host device 12-4, the packets 44 in network flow 42-2 are transmitted to host device 12-5, and the packets 44 in network flow 42-3 are transmitted to host device 12-6. In some embodiments, different flows 42 may be transmitted to the same host device 12.

Figure 8:
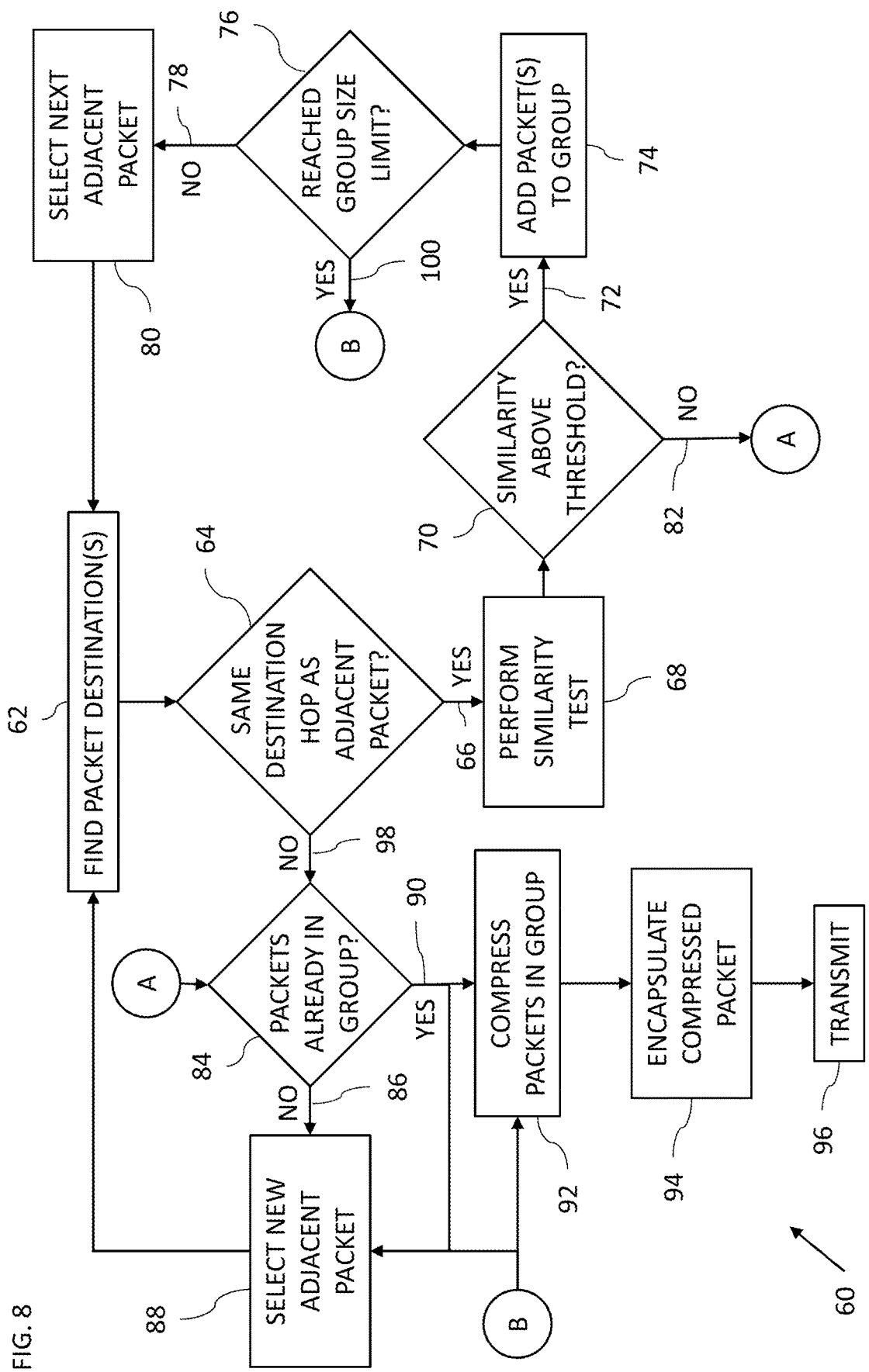
FIG. 8 is a flowchart including steps in a compression method performed by a network device in the system of FIG. 1.

Reference is now made to FIG. 8, which is a flowchart 60 including steps in a compression method performed by the network device 20-1 in the system 10 of FIG. 1. Reference is also made to FIG. 4.

The data compression engine 32 is configured to select two adjacent packets (referred to as a "pair of packets" below) from the pipeline 30. The data compression engine 32 is configured to find (block 62) the packet destinations of the pair of packets 44 in the pipeline 30. At a decision block 64, the data compression engine 32 is configured to determine if the pair of packets have a common destination hop in the end-to-end network 16 (FIG. 1). If the pair of packets have a common destination hop (branch 66), the data compression engine 32 is configured to perform (block 68) a similarity test between the pair of packets. At a decision block 70, the data compression engine 32 is configured to determine if the similarity is above a threshold similarity. If the similarity is above a threshold similarity (branch 72), the data compression engine 32 is configured to add (block 74) the pair of packets to a group awaiting compression. At a decision block 76, the data compression engine 32 is configured to determine if a group size limit has been reached. If the group size limit has not been reached (branch 78), the data compression engine 32 is configured to select (block 80) a next adjacent packet from the pipeline 30. The next adjacent packet (newly selected packet) now forms a new pair of packets with an adjacent one of the previously selected packets. The step of block 62 is repeated to find the packet destination of the newly selected packet and determine at the decision block 64 if the newly selected packet has the same common destination hop as the packets in the group. If the newly selected packet has the same common destination hop, the newly selected packet is compared for similarity with one or more of the packets in the group or with the result of the previous comparison. The steps are continued as described above and below.

Returning to the decision block 70, if the similarity is not above the threshold similarity (for either the first pair of packets 44 or any subsequent packet 44) (branch 82), processing continues at a decision block 84, in which the data compression engine 32 is configured to determine if there are already packets in a group awaiting compression. If there are no packets 44 in a group awaiting compression (branch 86), the data compression engine 32 is configured to select (block 88) a next adjacent packet 44 in the pipeline 30 and then processing continues with the step of block 62 and the decision block 64 in which the newly selected packet 44 is compared with an adjacent previously selected packet 44, and so on.

If there are packets 44 in a group awaiting compression (branch 90), the data compression engine 32 is configured to compress (block 92) the packets in the group yielding one of the compressed packets 48, encapsulate (block 94) that compressed packet 48 yielding one of the encapsulated packets 50, transmit (block 96) that encapsulated packet 50, and perform the step of block 88 in which a new pair of packets is selected and then processing continues with the step of block 62.

Returning to the decision block 64, if the packets (e.g., the first pair of packets, or the newly selected packet and an adjacent previously selected packet) do not have a common destination hop in the end-to-end network 16 (branch 98), processing continues with decision block 84 as described above.

Returning to the decision block 76, if the group size limit has been reached (branch 100) processing continues with the steps of blocks 92, 94, 96, and 88, as described above.

Figure 9:
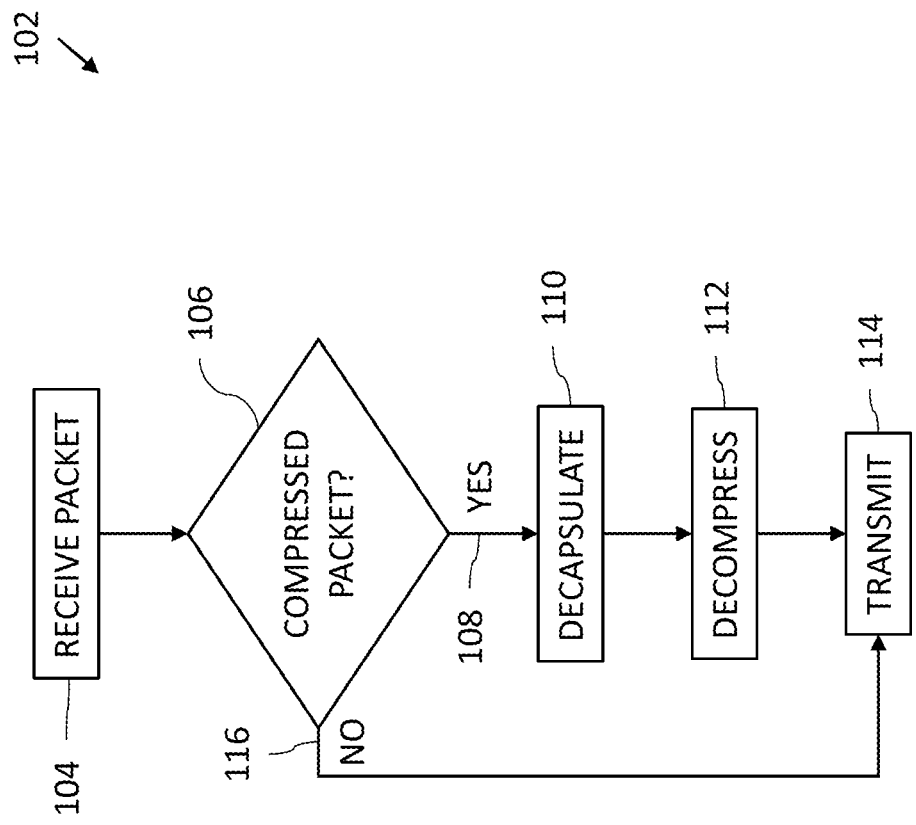
FIG. 9 is a flowchart including steps in a decompression method performed by a network device in the system of FIG. 1.

Reference is now made to FIG. 9, which is a flowchart 102 including steps in a decompression method performed by the network device 20-2 in the system 10 of FIG. 1. Reference is also made to FIG. 6.

The parsing engine 26 is configured to receive (block 104) a packet and classify the received packet. At a decision block 106, the pipeline 30 is configured to determine if the received packet is a compressed packet. If the received packet is a compressed packet (branch 108), the compressed packet is passed to the decapsulation engine 38 which is configured to decapsulate (block 110) the received packet. The data decompression engine 40 is configured to decompress (block 112) the received packet yielding a plurality of decompressed data packets. The data decompression engine 40 is configured to forward the decompressed data packets to the pipeline 30 or the network interface 22 of the network device 20-2. The network interface 22 is configured to transmit (block 114) the decompressed data packets to their respective host devices 12 (FIG. 1).

Returning to the decision block 106, if the received packet is not a compressed packet (branch 116), the network interface 22 is configured to transmit the received packet to its destination.

Figure 10A:
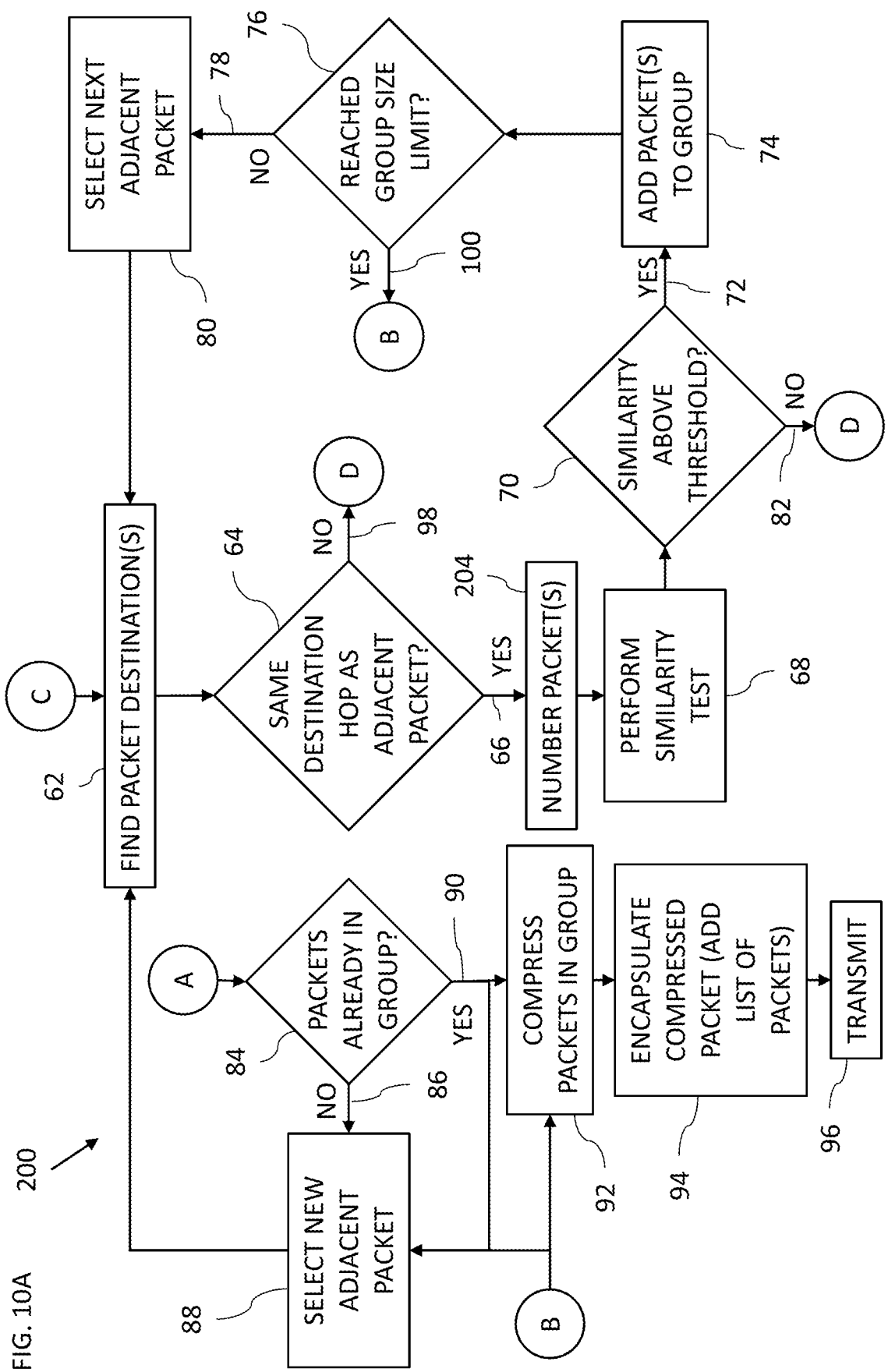
FIGS. 10A and 10B is a flowchart including steps in an alternative compression method performed by a network device in the system of FIG. 1.
Figure 10B:
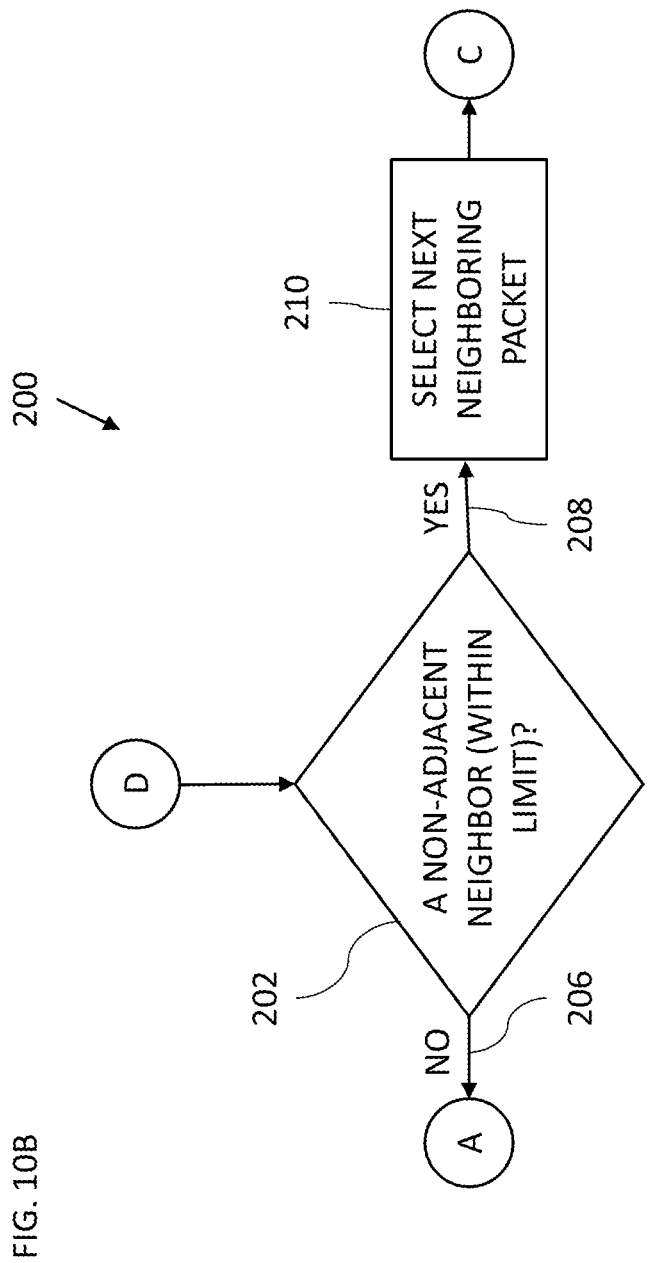

Reference is now made to FIGS. 10A and 10B, which is a flowchart 200 including steps in an alternative compression method performed by the network device 20-1 in the system 10 of FIG. 1. Reference is also made to FIG. 4. The alternative compression method also includes having non-consecutive packets 44 in one of the groups 46.

So for example, if a selected packet 44 does not have a common destination hop with its adjacent packet 44 in the pipeline 30, and even if the selected packet 44 does have a common destination hop with its adjacent packet 44, but the packets 44 are not sufficiently similar, the selected packet 44 may be compared with another packet 44 in the pipeline 30, e.g., the next packet 44 in the pipeline 30. In order to prevent packets 44 being processed out-of-order at the decompressing node (network device 20-2), the packets 44 are numbered in the compressing node (network device 20-1) and the encapsulated packet 50 includes the numbering of the packets included in that encapsulated packet 50. The numbering may then be used by the decompressing node to wait (until a given timeout) for the arrival of uncompressed intervening packets 44 prior to forwarding the decompressed and uncompressed packets 44 to their correct host devices 12 (FIG. 1) so that the packets 44 are forwarded to their host devices 12 in the same order that they appeared in the pipeline 30 of the compressing node. If the timeout expires, the decompressed packets 44 are sent to their host devices 12 without waiting for the intervening packets 44. The term "intervening packet", as used in the specification and claims, is defined as a packet in a sequence of packets in which the intervening packet is not compressed with the other packets in that sequence.

For example, four packets (P1, P2, P3, P4) are processed and three of them (P1, P2, P4) are similar. The packets are numbered 1 to 4, respectively. The data compression engine 32 compresses packets P1, P2, P4 into a compressed packet, and encapsulates that compressed packet yielding an encapsulated packet. The list of the packets (e.g., P1, P2, P4) is included in the header of that encapsulated packet. That encapsulated packet is sent to the decompressing node. The received encapsulated packet is decapsulated and decompressed yielding the packets P1, P2, P4. The decompressing node checks the list of the packets and determines that the packets are non-consecutive, and that packet P3 is part of the sequence of original uncompressed packets 44. The decompressing node sends packets P1 and P2 to the relevant host devices 12 and waits for packet P3 before sending P4 to its host device 12. When P3 arrives, it is processed and forwarded to its host device 12, followed by forwarding P4 to its host device 12. If P3 does not arrive within the timeout, P4 is sent to its host device 12 without further waiting for P3.

The flowchart 200 is substantially the same as the flowchart 60 of FIG. 8 except for the following differences.

At the decision block 64 (FIG. 10A), if the packets (e.g., the first pair of packets, or the newly selected packet and an adjacent previously selected packet) do not have a common destination hop in the end-to-end network 16 (branch 98), processing continues at a decision block 202 (FIG. 10B) as described below.

Between decision block 64 and block 68 (FIG. 10A), the data compression engine 32 is configured to number (block 204) the selected packet or packets. The packets may be numbered by adding data to the headers of the packets 44.

At decision block 70 (FIG. 10A), if the similarity is not above the threshold similarity (for either the first pair of packets 44 or any subsequent packet 44) (branch 82), processing continues at the decision block 202 (FIG. 10B) as described below.

The step of block 94 also includes the data compression engine 32 adding the (numbered) list of packets to the header of the encapsulated packet 50 containing the packets 44 listed in the list of packets.

At decision block 202, the data compression engine 32 determines if there is a non-adjacent neighboring packet 44 which has not been previously selected (optionally within a limit) to select as the next selected packet 44. If there is not a non-adjacent neighboring packet 44 to select (branch 206), processing continues with the decision block 84 of FIG. 10A. If there is a non-adjacent neighboring packet 44 to select (branch 208), the data compression engine 32 is configured to select (block 210) that non-adjacent neighboring packet 44 as the newly selected packet, and processing continues with the step of block 62 to find the packet destination of the newly selected packet and determine at the decision block 64 if the newly selected packet has the same common destination hop as packets 40 in the group (if a group of packets is awaiting compression) or a previously selected non-adjacent packet to which the newly selected packet will be compared for similarity. If the newly selected packet has the same common destination hop, the newly selected packet is compared for similarity with one or more of the packets in the group or with the result of the previous comparison or with the previously selected non-adjacent packet.

Figure 11:
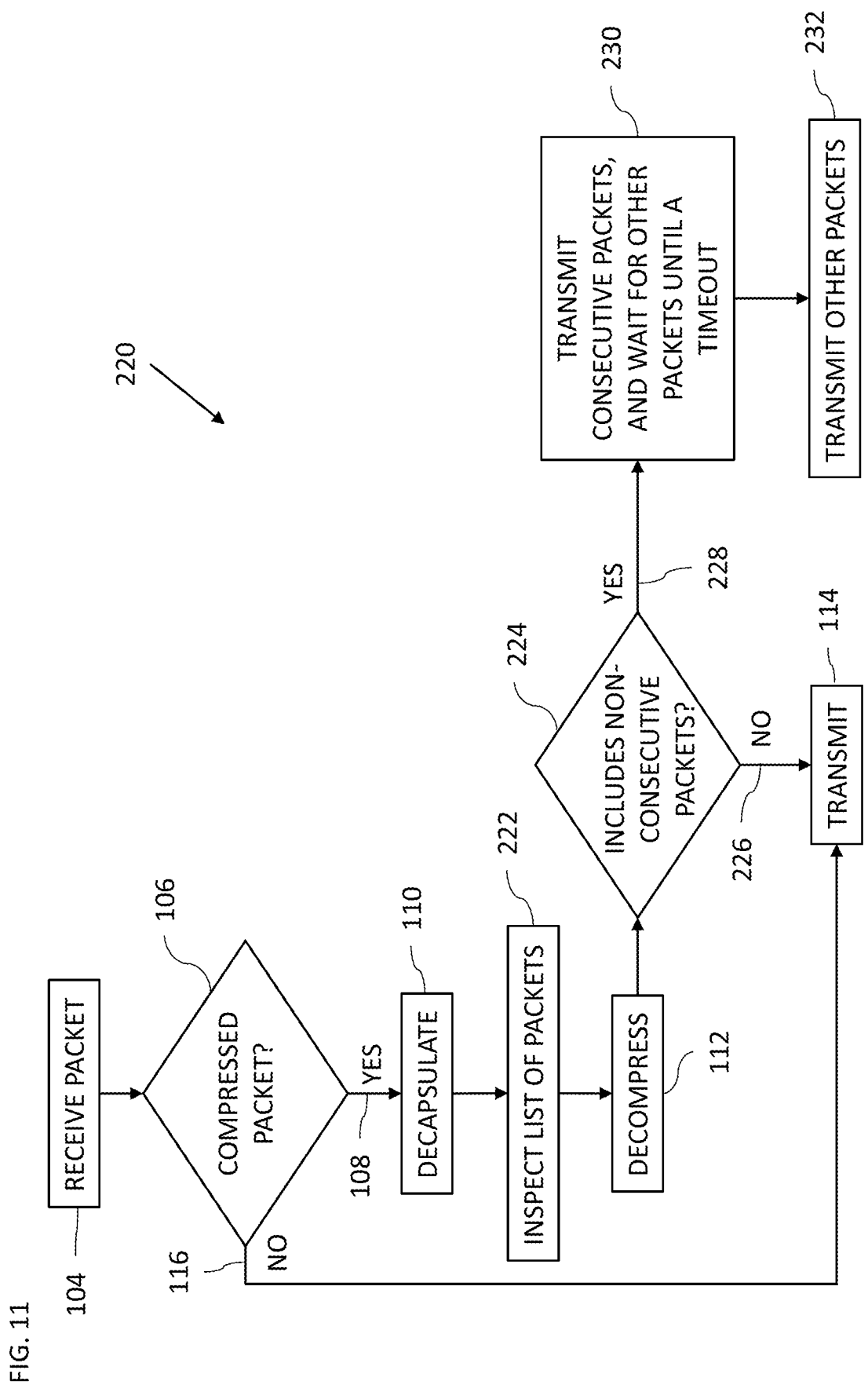
FIG. 11 is a flowchart including steps in an alternative decompression method performed by a network device in the system of FIG. 1.

Reference is now made to FIG. 11, which is a flowchart 220 including steps in an alternative decompression method performed by the network device 20 in the system 10 of FIG. 1.

The flowchart 220 is substantially the same the flowchart 102 of FIG. 9 except for the following differences.

The data decompression engine 40 is configured to inspect (block 222) the (numbered) list of packets, which list the numbers of the packets 44 included in the received encapsulated packet 50. The step of block 222 may be performed at any suitable point, for example, between the step of block 110 and the step of block 112 or even after the step of block 112. The data decompression engine 40 is configured to determine (at a decision block 224) if the received compressed packet 48 includes non-consecutive packets responsively to the (numbered) list of packets. If the received compressed packet 48 does not include non-consecutive packets (branch 226), the data compression engine 32 is configured to forward the decompressed packets for transmission by the network interface 22 (block 114). If the received compressed packet 48 does include non-consecutive packets (branch 228), the data compression engine 32 is configured to forward an initial portion of consecutive packets of the decompressed packets (if such a consecutive portion exists) for transmission by the network interface 22, and to wait (until a timeout) for the uncompressed intervening packet(s) 44 (intervening with respect to the sequence of non-consecutive decompressed packets) to arrive (block 230). The data compression engine 32 is configured to transmit (block 232) the non-consecutive decompressed packets from the received compressed packets 48 with the intervening packets 44 according to the order given by the list of packets. If the intervening packets 44 do not arrive within the timeout, the non-consecutive decompressed packets from the received compressed packets 48 are transmitted without further waiting for the intervening packets 44 to arrive.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A device, comprising: a network interface to receive data packets of multiple network flows from a network; processing pipeline circuitry to process data of the received data packets in a pipeline; and a data compression engine to: compress groups of the received data packets from different ones of the network flows into compressed packets, wherein each compressed packet comprises compressed data of multiple data packets of the received data packets, the multiple data packets being from different network flows of the multiple network flows, wherein the network interface is configured to send the compressed packets over the network,
  add a first one and a second one of the received data packets to one of the groups responsively to the first data packet and the second data packet having a first similarity result above a first given threshold; and add a third one of the received data packets to the one group responsively to the third data packet having a similarity to the first similarity result above a second given threshold.

2. A device, comprising: a network interface to receive data packets of multiple network flows from a network; processing pipeline circuitry to process data of the received data packets in a pipeline; and a data compression engine to: compress groups of the received data packets from different ones of the network flows into compressed packets, wherein each compressed packet comprises compressed data of multiple data packets of the received data packets, the multiple data packets being from different network flows of the multiple network flows, wherein the network interface is configured to send the compressed packets over the network,
add a first one and a second one of the received data packets to one of the groups responsively to the first data packet and the second data packet having a similarity result above a first given threshold; and add a third one of the received data packets to the one group responsively to the third data packet having a similarity to the second data packet above a second given threshold.

3. A device, comprising:
a network interface to receive compressed packets compressed by another device, wherein each compressed packet of the compressed packets comprises compressed data of multiple data packets of received data packets received by the other device, the multiple data packets being from at least some network flows of multiple network flows; and
a data decompression engine configured to:
process the compressed packets; and
decompress the compressed packets into groups of the received data packets for sending over the network to destination nodes responsively to header data of the received data packets, each group of the received data packets comprising the multiple data packets of the received data packets from different ones of the multiple network flows.

4. The device according to claim 3, further comprising a decapsulation engine configured to decapsulate the compressed packets prior to decompression of the compressed packets.

5. A computer network system, comprising: a first network device, comprising: a first network interface configured to receive data packets of multiple network flows from a network; processing pipeline circuitry configured to process data of the received data packets in a pipeline; and a data compression engine configured to compress groups of the received data packets into compressed packets each compressed packet including compressed data of multiple data packets of the received data packets, the multiple data packets being from different network flows of the multiple network flows, wherein the first network interface is configured to send the compressed packets over the network; and a second network device comprising: a second network interface configured to receive respective ones of the compressed packets from a network; and a data decompression engine configured to decompress ones of the compressed packets into groups of the data packets, wherein the second network interface is configured to send ones of the data packets over the network to respective destination nodes responsively to header data of the data packets, wherein the data compression engine is configured to: add a first one and a second one of the received data packets to one of the groups responsively to the first data packet and the second data packet having a first similarity result above a first given threshold; and add a third one of the received data packets to the one group responsively to the third data packet having a similarity to the first similarity result above a second given threshold.

6. A computer network system, comprising: a first network device, comprising: a first network interface configured to receive data packets of multiple network flows from a network; processing pipeline circuitry configured to process data of the received data packets in a pipeline; and a data compression engine configured to compress groups of the received data packets into compressed packets, each compressed packet including compressed data of multiple data packets of the received data packets, the multiple data packets being from different network flows of the multiple network flows, wherein the first network interface is configured to send the compressed packets over the network; and a second network device comprising: a second network interface configured to receive respective ones of the compressed packets from a network; and a data decompression engine configured to decompress ones of the compressed packets into groups of the data packets, wherein the second network interface is configured to send ones of the data packets over the network to respective destination nodes responsively to header data of the data packets, wherein the data compression engine is configured to: add a first one and a second one of the received data packets to one of the groups responsively to the first data packet and the second data packet having a similarity result above a first given threshold; and add a third one of the received data packets to the one group responsively to the third data packet having a similarity to the second data packet above a second given threshold.

* * * * *